United States Patent
Stephan

(10) Patent No.: US 7,634,468 B2
(45) Date of Patent: Dec. 15, 2009

(54) EXPANDED INVERTED INDEX

(75) Inventor: Wolfgang Stephan, Heidelberg (DE)

(73) Assignee: SAP AG, Walldorf (DE)

( * ) Notice: Subject to any disclaimer, the term of this patent is extended or adjusted under 35 U.S.C. 154(b) by 217 days.

(21) Appl. No.: 11/606,804

(22) Filed: Nov. 29, 2006

(65) Prior Publication Data

US 2007/0073668 A1    Mar. 29, 2007

Related U.S. Application Data

(63) Continuation of application No. 10/431,075, filed on May 6, 2003, now Pat. No. 7,149,748.

(51) Int. Cl.
*G06F 17/30* (2006.01)
*G06F 15/16* (2006.01)

(52) U.S. Cl. .............. 707/3; 707/2; 707/102; 707/104.1; 704/7

(58) Field of Classification Search ........ 707/3
See application file for complete search history.

(56) References Cited

U.S. PATENT DOCUMENTS

| | | | | |
|---|---|---|---|---|
| 5,542,090 | A | * | 7/1996 | Henderson et al. ........... 707/2 |
| 5,778,378 | A | * | 7/1998 | Rubin ................ 707/103 R |
| 5,915,249 | A | * | 6/1999 | Spencer ................. 707/5 |
| 5,963,965 | A | * | 10/1999 | Vogel .................. 715/236 |
| 2001/0049675 | A1 | * | 12/2001 | Mandler et al. ............ 707/1 |
| 2004/0158580 | A1 | * | 8/2004 | Carmel et al. ........... 707/104.1 |

OTHER PUBLICATIONS

F. Scholer H.E. Williams, J. Yiannis, J. Zobel. Compression of Inverted Indexes for Fast Query Evaluation. Proceedings of the 25th Annual International ACM SIGIR conference on Research and Development in Information Retrieval, pp. 222-229, Aug. 2002, but the paper was available in 2001.*

D. Bahle, H. E. Williams, J. Zobel. Efficient Phrase Querying with an Auxiliary Index. Proceedings of the 25th Annual International ACM SIGIR Conference on Research and Development in Information Retrieval, pp. 215-221, Aug. 2002, but the paper was available in 2001.*

F. Scholer H.E. Williams, J. Yiannis, J. Zobel, "Compression of Inverted Indexes for Fast Query Evaluation" 2001 (pp. 1-8).

D. Bahle, H.E. Williams, J. Zobel, "Efficient Phrase Querying with an Auxiliary Index" 2001 (pp. 1-7).

(Continued)

*Primary Examiner*—Greta L Robinson
*Assistant Examiner*—Brian E Weinrich
(74) *Attorney, Agent, or Firm*—Mintz, Levin, Cohn, Ferris, Glovsky and Popeo, P.C.

(57) ABSTRACT

Indexing documents is accomplished by generating an inverted index for a collection of one or more documents. The inverted index includes an inverted list for an index term appearing in one or more of the documents in the collection, and one or more postings. A posting includes a document identifier identifying a document in the collection of documents, a position identifier identifying a position of the index term in the document, and proximity information specifying whether the index term is positioned in a predefined proximal relationship between the index term and another a second index term in the document.

10 Claims, 4 Drawing Sheets

OTHER PUBLICATIONS

Christof Munz and Marten de Rejki, "Inverted Index Construction: Introduction to Information Retrieval," Spring 2002 (pp. 1-39).
Scholer et al., "Compression of Inverted Indexes for Fast Query Evaluation" 2001, 8 pages.
Bahle et al., "Efficient Phrase Querying with an Auxiliary Index" 2001, 7 pages.
Munz et al., "Inverted Index Construction::Introduction to Information Retrieval," Spring 2002, 39 pages.

* cited by examiner

400

| Index term | Common term | Inverted list $<d,k,f,[c_1,o_1,\ldots c_f,o_f]>$ |
|---|---|---|
| Jack | no | $<1,0,1,[1]> <3,0,1,[1]>$ |
| and | yes (c=4) | $<1,0,1,[2]> <3,0,1,[4]> <4,0,1,[1]>$ |
| Jill | no | $<1,1,1,[4,3]> <4,1,1,[4,2]>$ |
| went | no | $<1,0,1,[4]>$ |
| up | no | $<1,0,1,[5]>$ |
| the | yes (c=1) | $<1,0,1,[6]>$ |
| hill | no | $<1,1,1,[1,7]>$ |
| to | yes (c=5) | $<2,0,1,[1]>$ |
| fetch | no | $<2,1,1,[5,2]>$ |
| a | yes (c=3) | $<2,0,1,[3]>$ |
| pail | no | $<2,1,1,[3,4]>$ |
| of | yes (c=2) | $<2,0,1,[5]>$ |
| water | no | $<2,1,1,[2,6]>$ |
| fell | no | $<3,0,1,[2]>$ |
| down | no | $<3,0,1,[3]>$ |
| broke | no | $<3,1,1,[4,5]>$ |
| his | no | $<3,0,1,[6]>$ |
| crown | no | $<3,0,1,[7]>$ |
| came | no | $<4,0,1,[3]>$ |
| tumbling | no | $<4,0,1,[4]>$ |
| after | no | $<4,0,1,[5]>$ |

EXPANDED INVERTED INDEX

CROSS REFERENCE TO RELATED APPLICATIONS

This patent application is a Continuation of U.S. patent application Ser. No. 10/431,075, now U.S. Pat. No. 7,149,748, filed May 6, 2003, the contents of which are hereby incorporated by reference.

BACKGROUND

The following disclosure relates to techniques for indexing terms included in a collection of one or more documents, for example, by including in an inverted list associated with an index term information about pairing the index term with one or more common terms within the collection of documents.

Search engines can be used to locate keywords or phrases in a collection of documents. A search query typically includes one or more keywords, and can be formed, for example, using Boolean logic, or as a phrase, such as by including the search terms in quotation marks. A phrase query requires that two or more terms be located in a particular order within a document. The specificity of a phrase query typically yields a smaller set of more relevant results. Proximity operators used in Boolean logic search queries require two or more search terms to conform to a predefined proximal relationship, for example, a search query may specify that two search terms must occur within five words of each other in a document.

A search engine can evaluate a search query using an inverted index for the collection of documents. An inverted index includes a vocabulary of terms occurring in the documents and an inverted list for each index term. The vocabulary of terms can be arranged in a data structure, such as a B-tree. An inverted list includes one or more postings, where each posting identifies a document in the collection, a frequency of the index term in the identified document, and a list of offsets, which identify positions at which the index term appears in the identified document. For example, a posting in an inverted list for index term t may be configured as follows:

$$<d, f_{d,t}, [o_1, \ldots o_{fd,t}]>$$

where d identifies a document in the collection, f is the frequency of occurrences of the term t in the document d, and $o_1$ through $o_{fd,t}$ are offsets identifying positions of the term t in the document d.

A search engine evaluating a query traverses the inverted lists for each index term included in the query. For example, evaluating a query formed using Boolean logic may require traversing more than one list depending on the operator, such as OR (the union of component lists), AND (an intersection of component lists), SUM (the union of component lists), or a proximity operator (an intersection of component lists).

Evaluating a phrase query can be achieved by combining the inverted lists for the query terms to identify matching documents. However, the process can be slow, especially if the phrase includes one or more common (frequently occurring) words, which typically have large inverted lists.

Alternatively, an auxiliary index can be used, for example, an inverted index that indexes common terms and nextword pairs, such as the nextword auxiliary index described by D. Bahle, H. E. Williams and J. Zobel in *Efficient Phrase Querying with an Auxiliary Index*, Proceedings of the ACM-SIGIR Conference on Research and Development in Information Retrieval, Tampere, Finland, August 2002. This technique requires generating and storing the auxiliary index, which can be 10% of the size of the inverted index, if very few common words are indexed, and up to 200% the size of the inverted index if all firstword-nextword pairs are indexed.

A technique for evaluating search queries including common terms is 'stopping', where common terms are identified as stopwords and ignored when evaluating a search query. Ignoring stopwords can speed up the evaluation process, since fewer inverted lists need be found and retrieved from disk, and then processed. However, ignoring search term, particularly in a phrase query, can compromise search results and may be unacceptable in some applications.

SUMMARY

The present application describes apparatus and techniques relating to building or using an inverted index. In general, in one aspect, these apparatus and techniques feature generating an inverted index for a collection of one or more documents. The inverted index includes an inverted list for an index term appearing in one or more of the documents in the collection. The inverted list also includes one or more postings, where a posting has a document identifier identifying a document in the collection of documents, a position identifier identifying a position of the index term in the document, and proximity information specifying whether the index term is positioned in a predefined proximal relationship to a second index term in the document.

Implementations may include one or more of the following. The proximity information may include a flag indicating whether the index term is positioned in a predefined proximal relationship to a second index term in the document. The proximity information can further include an index term identifier identifying the second index term. The second index term can be a common term. The predefined proximal relationship can specify that the second index term immediately precedes the index term, or that the second index term immediately follows the index term. The predefined proximal relationship specifies that the second index term is positioned within a predefined proximity to the index term. A posting can further include a frequency of the index term occurring in the document. The proximity information can further specify whether the index term is positioned in a predefined proximal relationship to the second index term and a third index term in the document.

In general, in another aspect, the apparatus and techniques feature evaluating a search query including two or more index terms as follows. A search query is parsed to identify one or more groupings of index terms related by a predefined proximal relationship. Inverted lists are retrieved for each index term not included in a grouping, and for one index term for each grouping of index terms. The groupings are identified such that the sum of the retrieved inverted lists is minimized.

Other implementations may include one or more of the following. A search query can be evaluated based on the retrieved inverted lists. The grouping of index terms related by a predefined proximal relationship can be a pair, which includes a first index term immediately preceding a second index term. The first index term can be a common term, or alternatively, the second index term can be a common term. The grouping of index terms related by a predefined proximal relationship can be a triple including a first index term immediately preceded by a second index term and immediately followed by a third index term.

In general, in another aspect, the apparatus and techniques feature indexing documents, including creating an inverted index for a collection of one or more documents, the index including an inverted list for an index term included in the collection. The inverted list includes one or more postings, where a posting includes a document identifier identifying a document in the collection of documents, a flag indicating the index term is positioned next to a common term in the document, a frequency of the index term occurring in the document, a common term identifier identifying the common term, and a position identifier identifying a position of the index term in the document. Optionally, the flag can indicate that the index term is positioned immediately following, or alternatively immediately before, a common term in the document.

Various implementations can realize one or more of the following advantages. Using an expanded inverted index for search query evaluation, particularly phrase query evaluation, can yield performance results comparable to or exceeding other techniques, for example, an auxiliary index technique, while having an advantage of requiring less storage space. For example, an expanded inverted index including information about proximal relationships of index terms with the three most common terms increases the inverted index size by only approximately 3%. By contrast, an auxiliary index for the three most common terms is approximately 10% the size of the inverted index.

Moreover, use of an expanded inverted index may require fewer disk accesses to retrieve expanded inverted lists and involves less data transfer from disk to memory, thus decreasing the time cost of search query evaluation. That is, for example, evaluating a phrase query that includes a common term-infrequent term pair requires retrieving and processing an expanded inverted list for the infrequent term only, as compared to retrieving and processing an inverted list for both the common term (which list is typically large) and the infrequent term. An expanded inverted index can include information about proximal relationships of index terms, where the proximity relationship can be "nextword" (i.e., a pairing of two index terms) or any other specified proximity (e.g., within 4 word positions). The proximal relation can be between a common term and an infrequent term, or between any index term and a second index term. In this way, an expanded inverted index can be custom-built to facilitate search query evaluation in specific situations and/or related to specific document collections. Using an expanded inverted index can avoid the use of an auxiliary index, and accordingly help to minimize the administrative overhead costs associated with a second index, such as the costs of maintaining a separate index file and costs associated with transaction safety of index changes (e.g., updates and deletions) performed to maintain consistency of both index files.

The details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 4 is a table showing an example of an expanded inverted index.

DETAILED DESCRIPTION

The apparatus and techniques described here relate an inverted index for index terms included in a collection of one or more documents. As used herein, the terms "electronic document" and "document" mean a set of electronic data, including both electronic data stored in a file and electric data received over a network. An electronic document does not necessarily correspond to a file. A document may be stored in a portion of a file that holds other documents, in a single file dedicated to the document in question, or in a set of coordinated files.

An inverted index generated for a collection of documents includes a vocabulary of terms occurring in the documents and an inverted list for each index term. Index terms can be characterized as common terms and infrequent terms. Common terms are terms that occur with high frequency in a majority of the documents in the collection, for example, "the", "of" and "a". Infrequent terms are all index terms other than the common terms.

An expanded inverted list for an index term can be structured to improve phrase query searching without using an auxiliary index. Information about the proximity of common terms to an infrequent term is included in an expanded inverted list for the infrequent term. For example, information about each occurrence of the infrequent term immediately preceded by a common term can be included in the expanded inverted list, making it possible to identify occurrences of the common term-infrequent term pairs by traversing a single list, i.e. the expanded inverted list for the infrequent term. This is particularly useful when evaluating a phrase query, because a specific ordering of the terms typically is required.

Figure 1:
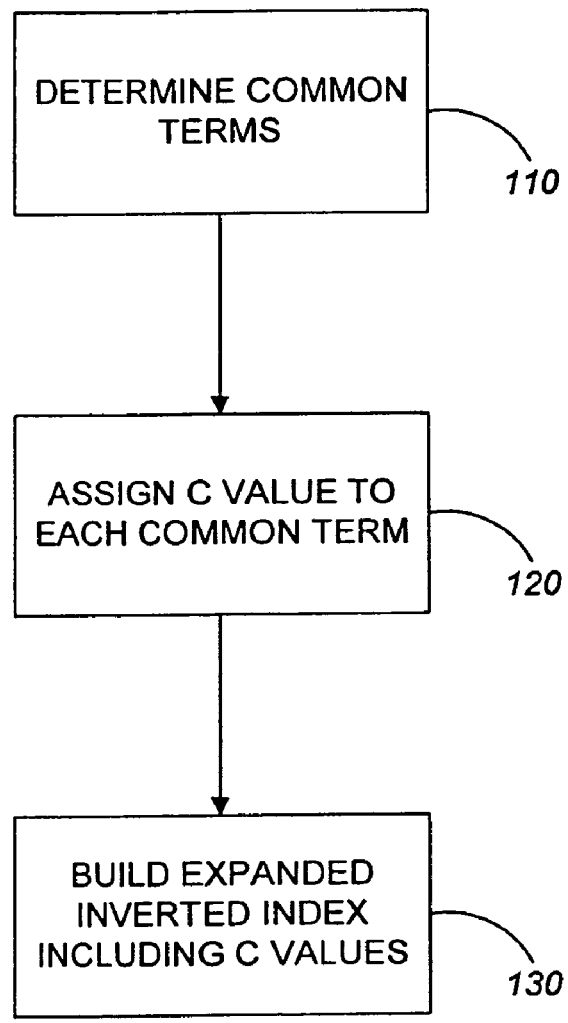
FIG. 1 is a flowchart showing a process for building an expanded inverted index.

In one implementation, information about the proximity of common terms to an infrequent term can be included in an expanded inverted list as follows. Referring to FIG. 1, the set of common terms for a collection of documents first is identified (Step 110). To minimize the increase in size of the inverted index due to the additional information, the number of common terms included in the set can be kept to minimum. For example, the set of common terms can include: 'the', 'of' and 'a'. An integer value, "c", is assigned to each common term in the set, for use in identifying the common term in the expanded inverted list (Step 120). For example, c values can be assigned as follows: c=1 for common term 'the'; c=2 for common term 'of'; and c=3 for common term 'a'. A default value of 0 is set for instances of no common term.

An expanded inverted index is then built for a collection of documents, with the expanded inverted lists including 'c' values identifying occurrences of common term-infrequent term pairs, where appropriate (Step 130). For example, a posting in an expanded inverted list can be in the form below:

$$<d, k, f_{d,t}, [c_1, o_1, \ldots c_{f_{d,t}}, o_{f_{d,t}}]>$$

where: d=document identifier;
k=flag indicating the occurrence of a common term-infrequent term pair;
$f_{d,t}$=frequency of occurrences of term t in document d;
$c_1$=c value identifying a common term (or absence of); and
$o_1$=offset value of term t in document d.

The flag k indicates whether there is one or more occurrences of a common term-infrequent term pair in the inverted list. The flag k can be set to 0 if no occurrences of a common word immediately precede the infrequent term t in the document d, and set to 1 if one or more occurrences immediately precede t. If no occurrences of a common word immediately precede the infrequent term t in the document d, i.e. k=0, then the c values can be eliminated from the offset list to minimize the size of the expanded inverted list. A c value of 0 indicates that no common word immediately precedes the infrequent term t in the document d at the corresponding offset.

By way of illustrative example, consider the following collection of documents, where each line in the rhyme is considered a separate document:

TABLE 1

| Document No. | Text |
| --- | --- |
| 1 | Jack and Jill went up the hill |
| 2 | to fetch a pail of water; |
| 3 | Jack fell down and broke his crown, |
| 4 | and Jill came tumbling after. |

Figure 2:
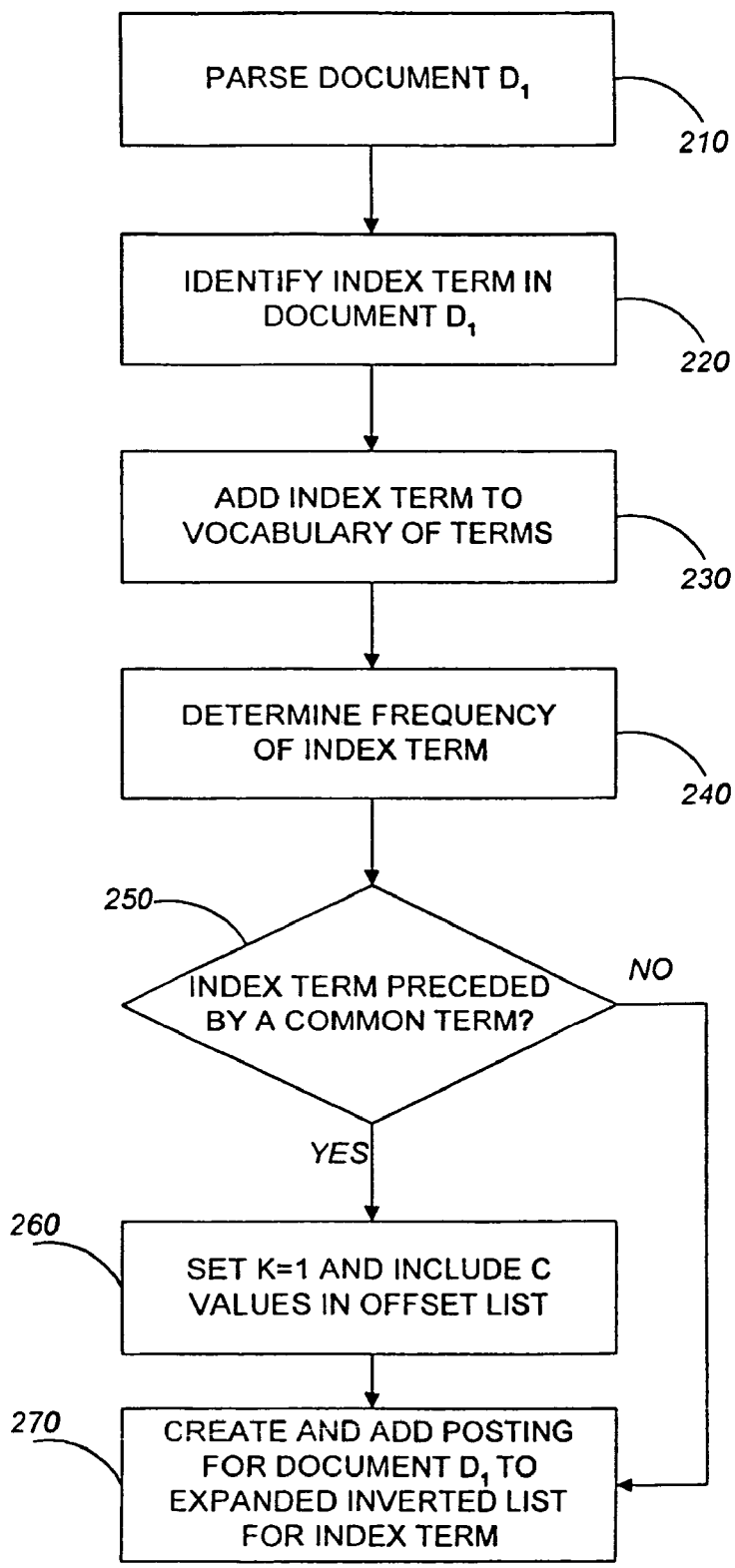
FIG. 2 is a flowchart showing a process for building an expanded inverted list.

Referring to Table 1 and FIG. 2, building an expanded inverted index for the collection of documents 1 through 4 requires parsing each document to create a vocabulary of index terms (Step 210). Table 2 below illustrates the vocabulary of 20 index terms included in the collection of documents. For the purpose of this example, the following index terms have been identified as common terms and assigned corresponding c values: the, c=1; of, c=2; a, c=3; and, c=4; to, c=5, as shown below in column 2 of Table 2.

For each index term included in the vocabulary of terms, an inverted list is generated, including information identifying occurrences of common term-infrequent term pairs. FIG. 4 shows an expanded inverted index 400 for the collection of documents that is also shown below in Table 2. According to this example the expanded inverted index would include the following vocabulary of terms and corresponding inverted lists:

TABLE 2

| Index term | Common term | Inverted list <d, k, f, [$c_1$, $o_1$, ... $c_f$, $o_f$]> |
| --- | --- | --- |
| Jack | no | <1, 0, 1, [1]> <3, 0, 1, [1]> |
| and | yes (c = 4) | <1, 0, 1, [2]> <3, 0, 1, [4]> <4, 0, 1, [1]> |
| Jill | no | <1, 1, 1, [4, 3]> <4, 1, 1, [4, 2]> |
| went | no | <1, 0, 1, [4]> |
| up | no | <1, 0, 1, [5]> |
| the | yes (c = 1) | <1, 0, 1, [6]> |
| hill | no | <1, 1, 1, [1, 7]> |
| to | yes (c = 5) | <2, 0, 1, [1]> |
| fetch | no | <2, 1, 1, [5, 2]> |
| a | yes (c = 3) | <2, 0, 1, [3]> |
| pail | no | <2, 1, 1, [3, 4]> |
| of | yes (c = 2) | <2, 0, 1, [5]> |
| water | no | <2, 1, 1, [2, 6]> |
| fell | no | <3, 0, 1, [2]> |
| down | no | <3, 0, 1, [3]> |
| broke | no | <3, 1, 1, [4, 5]> |
| his | no | <3, 0, 1, [6]> |
| crown | no | <3, 0, 1, [7]> |
| came | no | <4, 0, 1, [3]> |
| tumbling | no | <4, 0, 1, [4]> |
| after | no | <4, 0, 1, [5]> |

A posting in the expanded inverted list is created for each document in which the index term occurs. For example, consider the expanded inverted list for the index term 'Jack':

<1,0,1,[1]><3,0,1,[1]>

The index term Jack occurs in two documents, numbered 1 and 3, and accordingly the expanded inverted list includes two postings. The frequency of the occurrences of the index term in each document is determined (Step 240) and included in the corresponding posting, which in the above example is once per document (i.e., f=1). The k flag value for each Jack posting remains as the default value, zero, because Jack is not immediately preceded by a common term in either document. As such, the postings are created without including c values ('No' branch of Step 250). Referring to each offset list, it is apparent that Jack occurs as the first term in each document (i.e., o=1).

The expanded inverted list for the index term 'Jill' also includes two postings as follows:

<1,1,1,[4,3]><4,1,1,[4,2]>

It is apparent from the expanded inverted list that the index term Jill occurs in document nos. 1 and 4, and occurs only once in each document. Because Jill is immediately preceded by a common term at least once in each document ('Yes' branch of Step 250), the k value in each posting is set to 1, indicating that c values are included in the offset list (Step 260). Referring to the first posting, the c value is set to 4 and the offset value is set to 3 (Step 270). Accordingly, the index term Jill occurs as the third word in document no. 1, and is immediately preceded by the common term 'and', which has a c value of 4. According to the second posting, the index term Jill occurs as the second word in document no. 4, and also is immediately preceded by the common term 'and'.

In the above example, the documents are text documents. However, the expanded inverted index can be used for 'documents' of any nature, particularly those including frequent patterns alternated with infrequent patterns. Documents can include, for example, source code, binary files and tables of genetic code, and can be structured or unstructured.

In one implementation, the expanded inverted index can be compressed, for example, using integer compression schemes. A compressed expanded inverted index requires less storage space, and can be transferred more quickly from disk to memory. Additionally, because compressed expanded inverted lists require less storage space, more expanded inverted lists can be cached at one time, thus increasing the likelihood that a part of the expanded inverted index required to evaluate a search query is already cached in memory, which can avoid unnecessary disk accesses. Some integer compression schemes include Elias gamma and delta coding and Golomb-Rice coding. Schemes can be bitwise or bytewise, such as a bytewise scheme described by F. Scholer, H. E. Williams, J. Yiannis and J. Zobel in *Compression of Inverted Indexes for Fast Query Evaluation*, Proceedings of the ACM-SIGIR Conference on Research and Development in Information Retrieval, Tampere, Finland, August 2002. Other compression techniques can be used.

Figure 3:
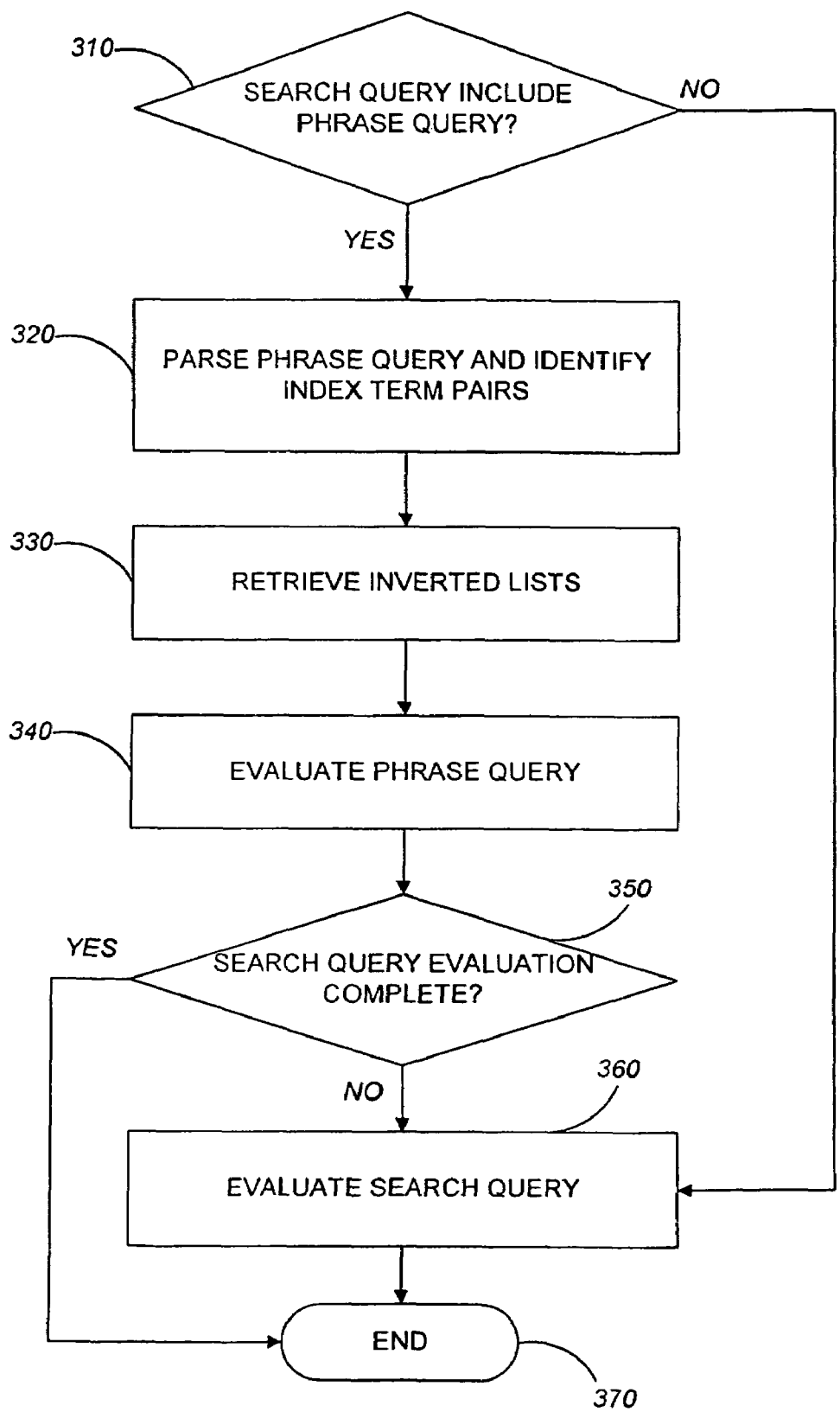
FIG. 3 is a flowchart showing a process for evaluating a search query using an expanded inverted index.

Referring to FIG. 3, an expanded inverted index that includes information from which common term-infrequent term pairs can be identified is particularly useful in evaluating a search query including a phrase query. For illustrative purposes, consider the following example, the phrase query: "Jack and Jill" ('Yes' branch of Step 310). A phrase query not only requires that a document include all of the search terms (i.e. Jack, and, Jill), but they must appear in the document in the order specified by the phrase query.

If a search query includes a phrase query, the phrase can be parsed to determine whether the phrase includes one or more index term pairs meeting a predefined proximity relationship, for example, a common term immediately followed by a second index term (Step 320). In this example, the phrase includes the common term-infrequent term pair "and Jill", because "and" is a common term which immediately precedes Jill, an infrequent term. The expanded inverted lists used to evaluate the phrase query are retrieved, for example, from disk into memory (Step 330). The expanded inverted lists include the lists for search terms that are not included in a common term-infrequent term pair, and the lists for the infrequent terms making up any common term-infrequent term pairs. The expanded inverted lists for any common terms included in common term-infrequent terms pairs are not retrieved, because they are not required to evaluate the query. In this example, the expanded inverted lists for Jack and for Jill are retrieved. The expanded inverted list for the index term 'and' is not required, because occurrences for 'and' will be located by traversing the expanded inverted list for Jill to locate occurrences of the 'and Jill' pair.

The phrase query is then evaluated using the retrieved expanded inverted lists (Step 340). For example, the expanded inverted list for the infrequent term, i.e. Jill, can be traversed to identify whether the index term Jill is immediately preceded by the common term 'and' in any documents in the collection. Then, taking into account the occurrences of "and Jill" located, the inverted list for the index term 'Jack' can then be traversed to identify occurrences satisfying the "Jack and Jill" phrase query. Although the first step identifies two occurrences of the "and Jill" pair, located in document nos. 1 and 4, the second step of evaluating the phrase query eliminates the pair found in document 4, because it is not preceded by the index term 'Jack', as required by the phrase query. The remaining result, document 1, is the result of the phrase query ('Yes' branch of Step 350).

If the phrase query was included in a search query that included terms outside of the phrase ('No' branch of decision step 350), then the remainder of the search query is evaluated (Step 360) and the process ends (Step 370). If the phrase query made up the entire search query ('Yes' branch of decision step 350), as in the example above, then the query evaluation is complete and the process ends (Step 370).

The step of parsing the phrase query to identify index term pairs can be complicated by the inclusion of the common term-common term pairs in the query. For example, consider the phrase query: "the silence of the lambs". The query could be parsed in at least the following two ways: 'the silence', 'of', 'the lambs'; or 'the silence', 'of the', 'lambs'. For performance reasons, the index term pairs are selected that minimize the sum of the sizes of the expanded inverted lists required to evaluate the query.

An advantage of evaluating a phrase query using the expanded inverted index is apparent from the above example. First, only two inverted lists (i.e. the 'Jack' expanded inverted list and the 'Jill' expanded inverted list), had to be traversed, rather than an inverted list for each of the three search terms. Second, traversing the inverted list for a common term (i.e. 'and'), which is typically large (although not in this particular example), was avoided. Third, because the inverted list for 'and' did not have to be traversed, transferring the list from disk to memory was avoided, i.e., fewer disk accesses.

An expanded inverted index can also be created to handle other instances of index term proximity. In one implementation, the expanded inverted index can include information about the pairing of an infrequent term immediately followed by a common term.

Alternatively, an expanded inverted index can include information about both common terms immediately preceding the index term and common terms immediately following the index term. In this instance, each posting includes two flags: one indicating whether the index term is preceded by any common terms, and the other indicating whether the index term is followed by any common terms. The offset list includes triples of information, that is, a c value for a common term immediately preceding the index term and a second c value for a common term immediately following the index term. A posting would be configured as follows:

$$<d,k_p,k_f,f,[c_{p1},c_{f1},o_1 \ldots c_{pf},c_{ff},o_f]>$$

where $k_p$ is a flag for common words preceding the index term, $k_f$ is a flag for common terms following the index term, $c_p$ is the c value of a common word preceding the index term, and $c_f$ is the c value of a common word following the index term.

For example, referring to the collection of documents in Table 1 above, an inverted list for the index term 'fetch' using this technique would be as follows: $<2,1,1,1,[5,3,2]>$. The $k_p$ and $k_f$ values are each set to 1, because the word fetch appears in document no. 2 between the common terms 'to' and 'a'. The $c_p$ value is set to 5, the c value for the common term 'to', and the $c_f$ value is set to 3, the c value for the common term 'a'.

As another example, the expanded inverted list for the index term 'Jack' using this technique would be as follows: $<1,0,1,1,[4,1]><3,0,0,1,[1]>$. In the first posting, $k_p$ is set to zero because 'Jack' is not immediately preceded by any common terms. The $k_f$ value is set to 1 because 'Jack' is immediately followed by a common term, namely, 'and'. The offset list does not include any $c_p$ values, because the $k_p$ flag is set to zero, but does include a $c_f$ value corresponding to the c value for the common term 'and'. In the second posting, the $k_p$ and $k_f$ values are both set to zero, because Jack is neither preceded nor followed by a common term. Accordingly, the offset list does not include any $c_p$ or $c_f$ values.

In another implementation, an expanded inverted index can include information about a first index term in any predefined proximity relationship with a second index term. In this manner, the technique can be used to improve proximity search query evaluation, in addition to phrase query evaluation.

As an illustrative example, in a collection of documents where the phrase "United States Patent and Trademark Office" frequently occurs and is frequently sought by search queries, an expanded inverted index can be created for the document collection that includes information about each occurrence of the index term 'Patent' within 4 positions (the proximity criteria) of the index term 'Office'. Each posting in the inverted list for Patent can include a k flag indicating whether or not there are any occurrences of the index term Patent within four positions of the index term Office, and a c value, for example 7, can be set to indicate an occurrence of the index term Office.

For example, if document no. 1 included the phrase "United States Patent and Trademark Office" at the beginning of the document, the inverted list for the expanded index term Patent is as follows:

$$<1,1,1,[7,3]>$$

The k flag is set to 1, indicating that the index term Patent is within the specified proximity to the index term Office. In the offset list, the c value of 7 (which represents the index term 'Office') is coupled with the offset value 3, indicating that the index term Patent occurs at the third position in the document and is within four positions (the proximity criteria) of the index term Office.

A proximity search using, for example, a Boolean logic search query, such as: Patent w/4 Office, can be evaluated by traversing the expanded inverted list for the index term Patent and locating those occurrences of the index term Patent within 4 word positions of the index term Office, without also having to traverse the expanded inverted list for the index term Office.

Other implementations of the expanded inverted index technique are possible.

Various implementations of the apparatus and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also know as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although only a few embodiments have been described in detail above, other modifications are possible. Portions of this disclosure discuss building an expanded inverted index to include proximity information, and search techniques to use such an expanded inverted index. The logic flows depicted in FIGS. 1 through 3 do not require the particular order shown, or sequential order, to achieve desirable results. In certain implementations, multitasking and parallel processing may be preferable. Other embodiments may be within the scope of the following claims.

What is claimed is:

1. A computer implemented method comprising:
    parsing, by at least one of one or more processors, each document in a collection of documents to create a vocabulary comprising a plurality of index terms that occur in the collection of documents, the plurality of index terms comprising commonly occurring terms and infrequently occurring terms, the commonly occurring terms differing from the infrequently occurring terms;
    identifying, by at least one of the one or more processors, the commonly occurring terms and assigning a unique common term identifier value to each of the commonly occurring terms;
    generating, by at least one of the one or more processors, a plurality of expanded inverted lists, each expanded inverted list of the plurality of expanded inverted lists corresponding to one of the plurality of index terms and comprising a posting for each document in the collection of documents that includes the corresponding one of the plurality of index terms, each posting comprising:
        an identification of the document of the collection of documents in which the corresponding one of the plurality of index terms appears,
        an indication of whether the corresponding one of the plurality of index terms in the one of the collection of documents is one of the infrequently occurring terms and whether the corresponding one of the plurality of index terms occurs immediately adjacent to one of the commonly occurring terms,
        a number of times the corresponding one of the plurality of index terms occurs in the one of the collection of documents,
        a location offset value specifying where in the document the corresponding one of the plurality of index terms occurs relative to a reference location in the document, and
        the unique common term identifier assigned to the commonly occurring one of the plurality of index terms if the corresponding one of the plurality of index terms occurs immediately adjacent to one of the commonly occurring terms;
    creating, by at least one of the one or more processors, an expanded inverted index that comprises the vocabulary and the expanded inverted list corresponding to each of the plurality of index terms;
    parsing, by at least one of the one or more processors, a search query that comprises a phrase query of two or more search terms that must appear in a specified order, the parsing comprising identifying a sequence of the search terms that includes a first one of the commonly occurring terms that is immediately followed or immediately preceded by one of the infrequently occurring terms and also identifying a second one of the search terms that is a second of the infrequently occurring terms and that is not immediately adjacent to one of the commonly occurring terms;
    retrieving, by at least one of the one or more processors, two or more of the plurality of expanded inverted lists from the expanded inverted index, the two or more of the plurality of expanded inverted lists comprising expanded inverted lists corresponding to the first and the second infrequently occurring index terms identified in the parsing; and
    returning, by at least one of the one or more processors, one or more documents of the collections of documents that appear in all of the retrieved two or more of the plurality of expanded inverted lists after evaluating the search query using only the retrieved two or more of the plurality of expanded inverted lists.

2. A method as in claim 1, wherein the indication of whether the corresponding one of the plurality of index terms in the one of the collection of documents is one of the infrequently occurring terms and that the corresponding one of the plurality of index terms occurs immediately adjacent to one of the commonly occurring terms indicates that the corresponding one of the plurality of index terms occurs immediately after one of the commonly occurring terms.

3. A method as in claim 1, wherein the indication of whether the corresponding one of the plurality of index terms in the one of the collection of documents is one of the infrequently occurring terms and that the corresponding one of the plurality of index terms occurs immediately adjacent to one of the commonly occurring terms indicates that the corresponding one of the plurality of index terms occurs immediately before one of the commonly occurring terms.

4. A method as in claim 1, wherein each posting further comprises information about whether the corresponding one of the plurality of index terms in the one of the collection of documents is one of the infrequently occurring terms and that the corresponding one of the plurality of index terms occurs both immediately after one of the commonly occurring terms and immediately before another one of the commonly occurring terms; and
    wherein the parsing further comprises identifying an additional sequence of the search terms that includes one of the commonly occurring terms that is both immediately followed and immediately preceded by one of the infrequently occurring terms.

5. A method as in claim 1, wherein the documents in the collections of documents comprise one or more of source code, binary files, tables of genetic code, text documents, structured documents, and unstructured documents.

6. A method as in claim 1, further comprising compressing the expanded inverted index using an integer compression scheme.

7. A method as in claim 1, wherein the vocabulary comprises all index terms that occur in the collection of documents.

8. A method as in claim 1, wherein the reference location is a beginning of the document and wherein the location offset value indicates how many terms from the beginning of the document the corresponding term is.

9. A computer-implemented method comprising:
parsing, by at least one of one or more processors, a search query that comprises a phrase query of two or more search terms that must appear in a specified order, the parsing comprising identifying a sequence of the search terms that includes a first one of a plurality of commonly occurring terms that is immediately adjacent to one of a plurality of infrequently occurring terms and also identifying a second of the search terms that is a second one of the plurality of infrequently occurring terms and that is not immediately adjacent to any of the commonly occurring terms;
retrieving, by at least one of the one or more processors, two or more expanded inverted lists of a plurality of expanded inverted lists that comprise an expanded inverted index, the expanded inverted index comprising a vocabulary that comprises a plurality of index terms that occur in a collection of documents that are searched in response to the search query, each of the plurality of expanded inverted lists corresponding to one of the plurality of index terms, the plurality of index terms comprising commonly occurring terms and infrequently occurring terms, the commonly occurring terms and infrequently occurring terms differing form each other, each expanded inverted list comprising a posting for each document in the collection of documents that includes the corresponding index term, each posting in each expanded inverted list comprising:
an identification of the document of the collection of documents in which the corresponding index term appears,
an indication of whether the corresponding index term in the one of the collection of documents is one of the infrequently occurring terms and whether the corresponding index term occurs immediately adjacent to one of the commonly occurring terms,
a number of times the corresponding index term occurs in the one of the collection of documents,
a location offset value specifying where in the document the corresponding term occurs relative to a reference location in the document, and
a unique common term identifier assigned to the commonly occurring term if the corresponding index term occurs immediately adjacent to one of the commonly occurring terms,
the retrieved two or more of the plurality of expanded inverted lists corresponding to the first and the second infrequently occurring index terms identified in the parsing;
returning, by at least one of the one or more processors, one or more documents of the collections of documents that appear in the all of the two or more of the plurality of expanded inverted lists after evaluating the search query using only the retrieved two or more of the plurality of expanded inverted lists.

10. An apparatus comprising:
one or more processors that perform functions comprising:
parsing each document in a collection of documents to create a vocabulary comprising a plurality of index terms that occur in the collection of documents, the plurality of index terms comprising commonly occurring terms and infrequently occurring terms, the commonly occurring terms differing from the infrequently occurring terms;
identifying the commonly occurring terms and assigning a unique common term identifier value to each of the commonly occurring terms;
generating a plurality of expanded inverted lists, each expanded inverted list of the plurality of expanded inverted lists corresponding to one of the plurality of index terms and comprising a posting for each document in the collection of documents that includes the corresponding one of the plurality of index terms, each posting comprising:
an identification of the document of the collection of documents in which the corresponding one of the plurality of index terms appears,
an indication of whether the corresponding one of the plurality of index terms in the one of the collection of documents is one of the infrequently occurring terms and whether the corresponding one of the plurality of index terms occurs immediately adjacent to one of the commonly occurring terms,
a number of times the corresponding one of the plurality of index terms occurs in the one of the collection of documents,
a location offset value specifying where in the document the corresponding one of the plurality of index terms occurs relative to a reference location in the document, and
the unique common term identifier assigned to the commonly occurring one of the plurality of index terms if the corresponding one of the plurality of index terms occurs immediately adjacent to one of the commonly occurring terms;
creating an expanded inverted index that comprises the vocabulary and the expanded inverted list corresponding to each of the plurality of index terms;
parsing a search query that comprises a phrase query of two or more search terms that must appear in a specified order, the parsing comprising identifying a sequence of the search terms that includes a first one of the commonly occurring terms that is immediately followed or immediately preceded by one of the infrequently occurring terms and also identifying a second one of the search terms that is a second of the infrequently occurring terms and that is not immediately adjacent to one of the commonly occurring terms;
retrieving of the plurality of expanded inverted lists from the expanded inverted index, the two or more of the plurality of expanded inverted lists comprising expanded inverted lists corresponding to the first and the second infrequently occurring index terms identified in the parsing; and
returning one or more documents of the collections of documents that appear in all of the retrieved two or more of the plurality of expanded inverted lists after evaluating the search query using only the retrieved two or more of the plurality of expanded inverted lists.

* * * * *

UNITED STATES PATENT AND TRADEMARK OFFICE
CERTIFICATE OF CORRECTION

PATENT NO. : 7,634,468 B2
APPLICATION NO. : 11/606804
DATED : December 15, 2009
INVENTOR(S) : Wolfgang Stephan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this

Ninth Day of November, 2010

David J. Kappos
*Director of the United States Patent and Trademark Office*